(12) United States Patent
Grigaliunas et al.

(10) Patent No.: US 11,077,961 B2
(45) Date of Patent: Aug. 3, 2021

(54) SATELLITES ATTITUDE CONTROL SYSTEM

(71) Applicant: UAB "PAZANGUS POZICIONAVIMO SPRENDIMAI", Kaunas (LT)

(72) Inventors: Valdas Grigaliunas, Kaunas (LT); Andrius Vilkauskas, Kaunas (LT); Algis Karpavicius, Kaunas (LT); Marius Gudauskis, Telsiai (LT)

(73) Assignee: UAB "PAZANGUS POZICIONAVIMO SPRENDIMAI", Kaunas (LT)

( * ) Notice: Subject to any disclaimer, the term of this patent is extended or adjusted under 35 U.S.C. 154(b) by 373 days.

(21) Appl. No.: 15/747,570

(22) PCT Filed: Aug. 12, 2015

(86) PCT No.: PCT/IB2015/056143
§ 371 (c)(1),
(2) Date: Jan. 25, 2018

(87) PCT Pub. No.: WO2017/025778
PCT Pub. Date: Feb. 16, 2017

(65) Prior Publication Data
US 2018/0215483 A1    Aug. 2, 2018

(51) Int. Cl.
*B64G 1/28*    (2006.01)

(52) U.S. Cl.
CPC .................................... *B64G 1/283* (2013.01)

(58) Field of Classification Search
CPC .......... B64G 1/28; B64G 1/283; B64G 1/286; B64G 1/288
See application file for complete search history.

(56) References Cited

U.S. PATENT DOCUMENTS

| 3,258,223 A | * | 6/1966 | Skov | ...................... | B64G 1/288 |
| | | | | | 244/166 |
| 2001/0017665 A1 | * | 8/2001 | Ackermann | ........... | H02N 2/103 |
| | | | | | 348/374 |

(Continued)

FOREIGN PATENT DOCUMENTS

| EP | 1111692 A2 | 6/2001 |
| JP | S6117741 A | 1/1986 |

(Continued)

OTHER PUBLICATIONS

Amano T et al., "An Ultrasonic Actuator with Multidegree of Freedom Using Bending and Longitudinal Vibrations of a Single Stator", Proceedings / 1998 IEEE Ultrasonics Symposium : Oct. 5-8, 1998, Hotel Metropolitan Sendai, Sendai, Miyagi, Japan ; An International Symposium, IEEE, Piscataway, NJ, USA, vol. 1, pp. 667-670, Oct. 5, 1998, XP010330913, ISBN: 978-0-7803-4095-4, DOI: 10.1109/ULTSYM.1998.762236.

(Continued)

*Primary Examiner* — Michael H Wang
(74) *Attorney, Agent, or Firm* — AAA Law, UAB (57) ABSTRACT

This disclosure relates to a satellite attitude control apparatus, comprising a spherical inertial body (1), which is arranged to be rotated in space in a desired rotational mode, one or more rotational feedback sensors. The apparatus further comprises a set of supports (3) and/or actuators (2), whereas one or more actuator is used to create rotational momentum to the spherical inertial body through friction. A set of three or more actuators and supports is used in order to keep the inertial body in place. Three or more supporting elements (supports and actuators) are used in combination with magnetic attraction or four or more supporting elements are used in case magnetic attraction is not in use.

(Continued)

Supports can be passive or semi-active in order to reduce friction.

14 Claims, 6 Drawing Sheets

(56) References Cited

U.S. PATENT DOCUMENTS

| | | | |
|---|---|---|---|
| 2014/0209751 A1* | 7/2014 | Stagmer | B64G 1/244 |
| | | | 244/165 |
| 2014/0263845 A1* | 9/2014 | Chalfant, III | B64G 1/286 |
| | | | 244/165 |
| 2015/0001345 A1* | 1/2015 | Polle | B64G 1/26 |
| | | | 244/158.6 |
| 2015/0027244 A1* | 1/2015 | Casteras | B64G 1/28 |
| | | | 74/5.46 |
| 2015/0166200 A1* | 6/2015 | Kim | B64G 1/24 |
| | | | 310/90 |
| 2017/0046969 A1* | 2/2017 | Lee | G01M 99/00 |
| 2017/0320598 A1* | 11/2017 | Bushroe | B64G 1/28 |
| 2018/0016035 A1* | 1/2018 | Bandera | B64G 1/286 |

FOREIGN PATENT DOCUMENTS

| | | |
|---|---|---|
| LT | 6089 B | 10/2014 |
| WO | WO-2014017817 A1 | 1/2014 |

OTHER PUBLICATIONS

International Search Report and Written Opinion dated May 19, 2016 for PCT Application No. PCT/IB2015/056143.

* cited by examiner

SATELLITES ATTITUDE CONTROL SYSTEM

FIELD OF INVENTION

This invention relates to compact satellite positioning systems. More specifically it relates to gyroscopic apparatus having rotating mass, preferably in a shape of a sphere, having multiple rotation degrees.

BACKGROUND OF INVENTION

With reduction in size of various electronic measurement devices, video cameras and various signal and communication equipment, artificial satellites are also getting smaller. As a result, the cost of the satellite itself and its rocket launching is reduced significantly. Compact and more lightweight solutions are desired in all nodes of a satellite, including attitude control system. One of such nodes is a reaction sphere positioning systems of a satellite, which is used to position a satellite in space and for example point its communication or observation devices to a desired spot on earth or desired direction in space.

Historically, satellite attitude control systems were build by using a cylindrical flywheel or reaction wheel concept, whereas up to 3 flywheels are rotated in different rotational modes, with rotation axes located preferably in X, Y and Z directions. The support of these flywheels is rigidly attached to the frame of the satellite. By choosing the right ratio of inertia of all flywheels, the orientation of the satellite can be controlled in weightless environment.

Significant effort has been put to reduce the size and weight of such flywheels. One of the directions is to equip a single rotational body, such as a multiple rotation sphere and actuate it by using electromagnetic fields. Such sphere comprises permanent magnets and acts like a rotor, multiple electromagnets are located in a stator frame, surrounding the sphere.

Japanese patent JP6117741A describes an apparatus, which enables the positions of multiple shafts to be controlled for reducing the size, weight and number of parts of one unit of fly wheel device, by supporting a rotor consisting of one ball in the contact-less manner and permitting the rotor to be controllably rotated around any axes. In this solution electromagnets are disposed outside a hollow spherical rotor 10 to extent through the center of the rotor and sandwich the rotor with each other on the axes X, Y and Z orthogonal to each other, so that a magnetic bearing for supporting the rotor 10 with magnetic attraction in the contact-less manner is constituted. Also, outside the electromagnets opposed to each other on the respective axes are provided stators concentrically with the electromagnets so that the rotor can be rotated around any axes by a magnetic force due to the stators; Thus, fly wheel devices respectively mounted on three axes of a prior artificial satellite can be replaced for one unit of the fly wheel device.

PCT patent application No. WO2014017817 describes a three-dimensional rigid ball driving system comprising: a support frame having a polyhedral shape; a rigid ball located at the inner center of the support frame; a plurality of ball bearings installed at the inner edge of the support frame and contacting the surface of the rigid ball; a plurality of electromagnets arranged around the ball bearings so as to form a magnetic field for rotating the rigid ball; and a control unit for controlling the electromagnets so as to control the direction of rotation and speed of rotation of the rigid ball. According to the present invention, the rigid ball installed inside an attitude-control apparatus of a satellite is supported by a plurality of ball bearings, thus eliminating the necessity of installing a magnetic levitation device for levitating the rigid ball in the air. Further, the position of the rigid ball is maintained by vibrations or the like, thus enabling the accurate control of the attitude of the satellite.

Lithuanian patent No. LT6089 describes a satellite guidance device. The invention is based on the rotating mass moment of inertia of change affect for satellite guidance, in particular the use of the body mass of the spherical satellite orientation in the three spatial axes, and piezoelectric actuators enabling the rotation of the sphere by combining any of the three axis. Satellite orientation device, consisting of a certain mass of the sphere and rotational motion to generate a piezoelectric actuator, which consists of at least 2-piezoceramic hemisphere surrounding the sphere and the resilient element between one of the piezoceramic hemisphere and the housing, or in place of piezoceramic hemisphere device may have piezoceramic cylinder to which sphere with a permanent magnet attached to the body is pressed against the intermediate elements which are attached to the piezoceramic cylinder. Presented device for its simple design can be used in any space satellites.

In the recent patent the piezoceramic hemisphere has segmented electrodes, which allows to induce vibrations of the piezoelectric actuator in discrete areas, thus creating a rotational movement of the sphere. However the major drawback of such solution is that the segmented piezoceramic actuator features a negative property called vibrational cross-talk, which causes vibrations created in one segment of the piezoceramic actuator to be induced into another segment and its point of tangency with the sphere. Furthermore, having a hemisphere or a cylinder, which covers large part of the surface area of the spherical inertial body, makes it difficult to install sensor system for active feedback of induced rotation.

In other areas of technology, several solutions are described relating to manipulation of spherical bodies in order to change their orientation. Some innovative technical solutions describe piezo-electrical actuators capable of rotating a spherical body in virtually any direction with an application in video camera positioning.

The European patent EP1111692 describes an actuator having multiple piezo-electrical driving mechanisms and a sphere with a video camera rotating around two or more axes of rotation. A structure transmits images and sound from the actuator. The piezo-electrical driving mechanisms can turn the sphere in a random manner and can use friction through oscillations in a tangential direction.

Prior art solutions having electromagnetic actuators are still bulky and strong electromagnetic fields might cause interference with sensitive electronics equipment in a satellite as well as interference with magnetic fields of planets. Components cost and overall complexity is higher, as well as electromagnet based solutions require sophisticated control signals.

SUMMARY

This invention aims to create a multiple rotation positioning apparatus or attitude control system for small artificial satellites.

The satellite positioning system comprises a spherical inertial body, supports, one or more actuators and electronics to control actuators according to a signal from a feedback sensor. Supports can be passive or semi-active. Supports are used to keep the inertial body in its place, allowing 3D rotation and they can be mounted on a suspension subsystem or without it. Passive supports have no active elements and its purpose is to keep inertial body in a predetermined place. Semi-active support—has an active element which can reduce friction between support element and inertial body (for example tangential or normal high frequency vibrations in small magnitude). An actuator comprises an active element, main purpose of which is to create movement to the inertial body, but it also serves as a support for the inertial body.

DESCRIPTION OF DRAWINGS

Drawings are provided as reference only and in no way should limit the scope of the invention. None of the nodes depicted in the drawings shall be deemed as limiting, rather just as an example of many possible embodiments.

DETAILED DESCRIPTION OF PREFERRED EMBODIMENTS

This disclosure relates to satellite attitude control systems.

The purpose of the system is to generate controllable rotation momentum for satellite orientation in space. The system comprises one or more friction drive actuators (2), a spherical inertial body (1), means for keeping the inertial body in its place and allowing 3D rotation, such as supports (3) mounted on a suspension subsystem (4). The system further comprises electronics to control actuators according to signals from one or more rotational feedback sensors.

Herewith 'friction based actuator' or 'friction drive actuator' means any actuator which transfers movement to another body through friction—directly or through an intermediate element, whereas an active element of the actuator is solid and is in contact with the body to be actuated directly or through intermediate element/elements.

In case of this invention, the body to be actuated is preferably a spherical inertial body (1).

Supports (3) of the inertial body are semi-active or passive. In case of passive supports, it does not comprise any active elements and its purpose is to keep inertial body (1) in its place. The semi-active support comprises an element which can reduce friction between the support element and the inertial body, for example, a solid vibrating element, having high frequency vibrations of small magnitude, whereas the vibrations are tangential or normal to the surface of the inertial body (1).

The at least one actuator (2) is generally an active element. The main purpose of the actuator is to transfer movement to the inertial body and thus create a rotational momentum, but it also serves as a support, both in its active state and in a passive state.

In one embodiment, the attitude control system comprises a spherical inertial body, which is arranged to be rotated in space in a desired rotational mode, one or more rotational feedback sensors, a set of discrete supports and/or actuators, whereas one or more actuator is used to create rotational momentum to the spherical inertial body through friction and one or more support is used to keep the inertial body in place. A set of 4 or more actuators and supports is used. Supports can be passive or semi-active in order to reduce friction. The purpose of the system is to generate controllable rotation momentum for satellite orientation in space. Said actuators are preferably controlled in pulses or series of pulses in order to precisely control the attitude of the satellite. As one of the ways is also to use pulse width modulation (PWM) of an electric control signal.

Figure 2:
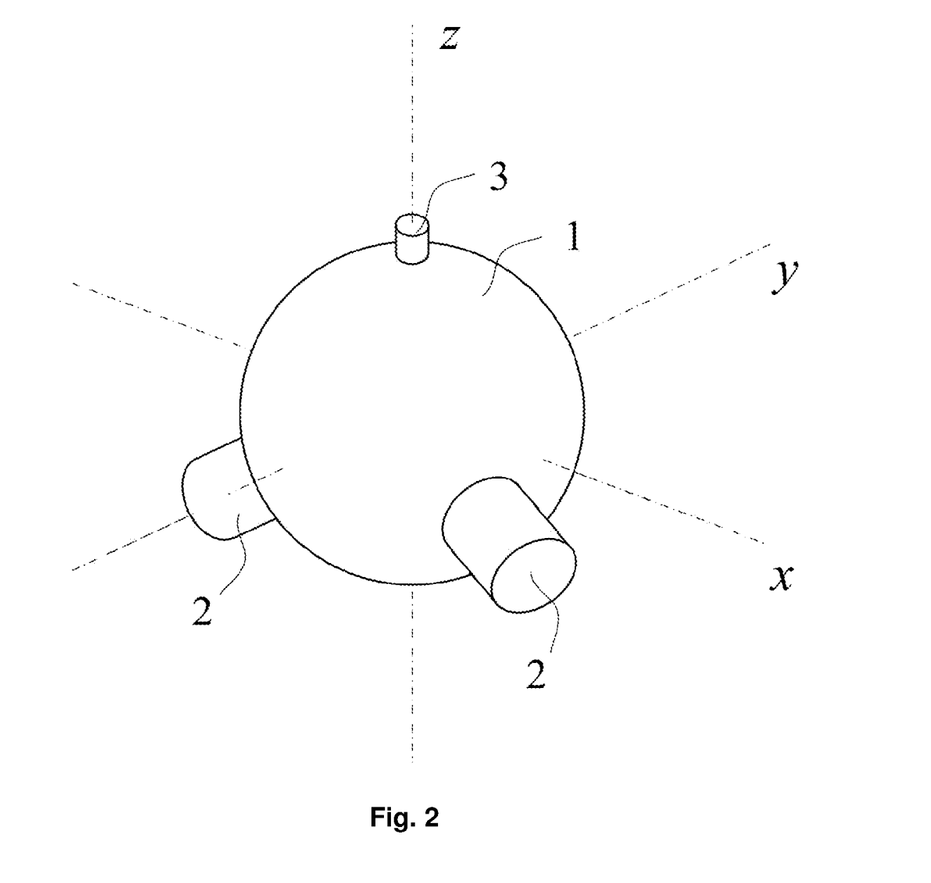
FIG. 2 is a schematic drawing of multiple rotation system having one support and three actuators (side view).
Figure 3:
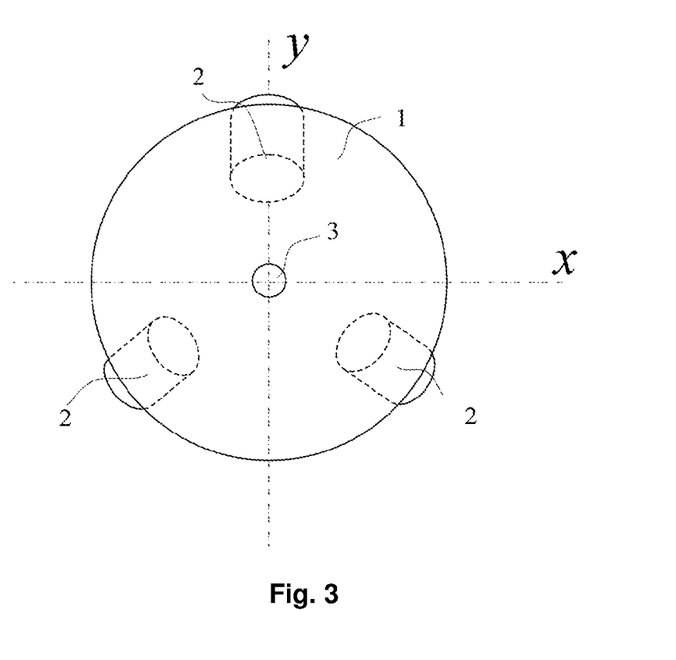
FIG. 3 is a schematic drawing of multiple rotation system having one support and three actuators (top view).
Figure 4:
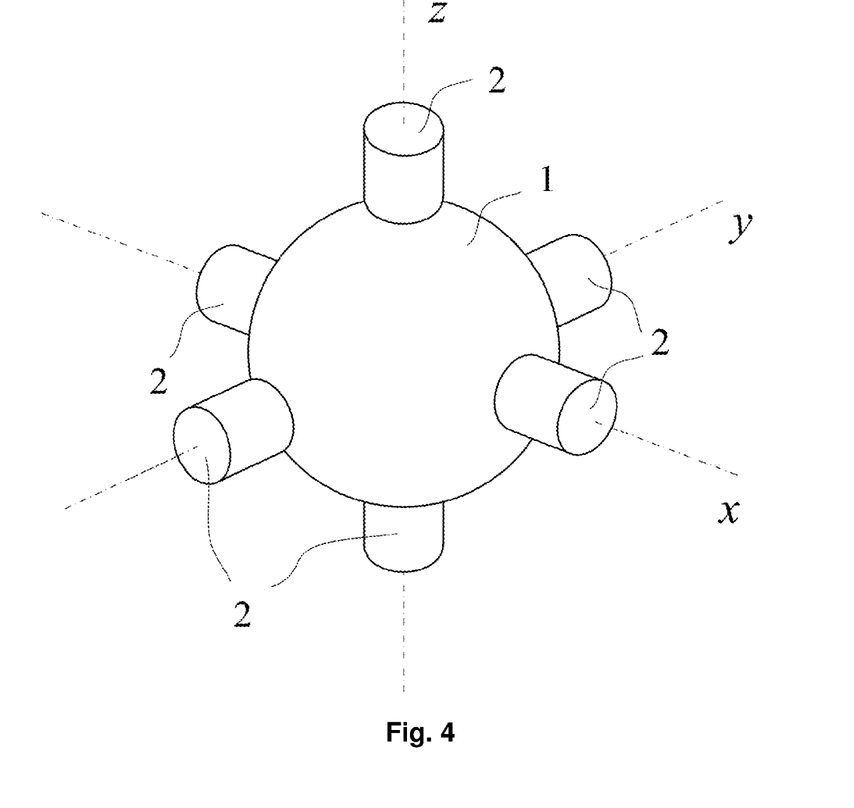
FIG. 4 is a schematic drawing of multiple rotation system having six actuators.
Figure 5:
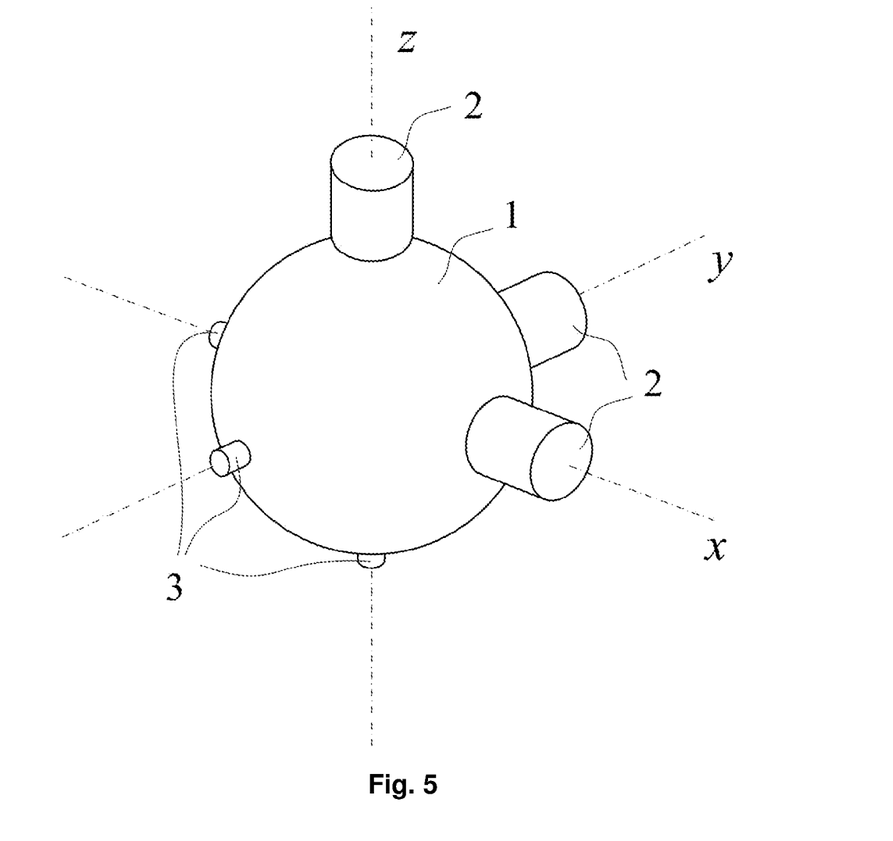
FIG. 5 is a schematic drawing of multiple rotation system having three supports and three actuators.
Figure 6:
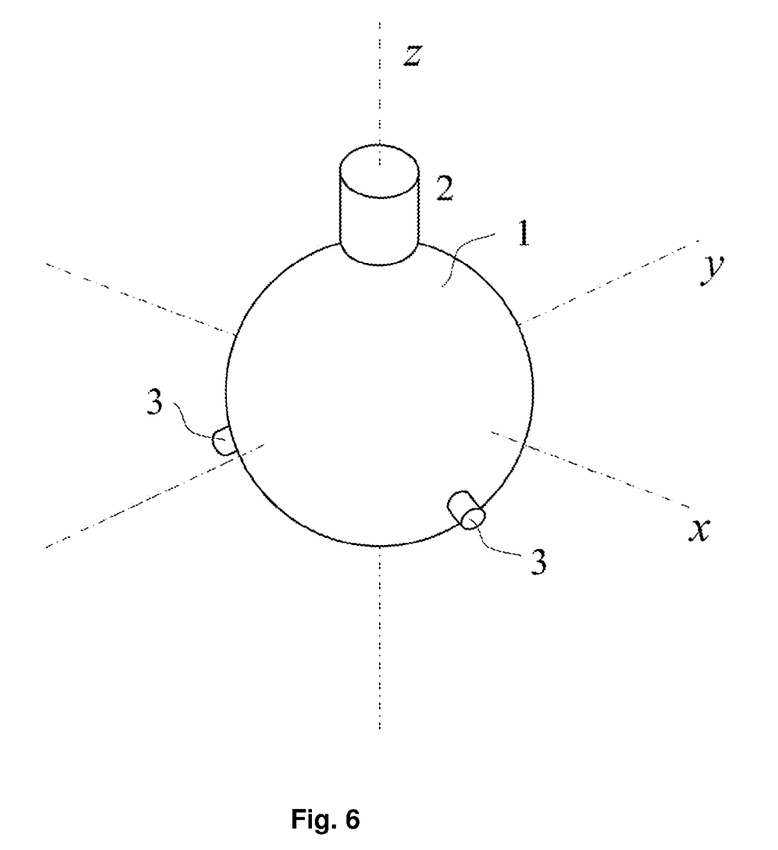
FIG. 6 is a schematic drawing of multiple rotation system having three supports and one actuator.

In one of the most simplest embodiments, there is just one support element (3), as depicted in FIG. 2.

Yet in another embodiment, the system comprises just three points supporting the sphere and the sphere is retained in position by using a magnetic field. In this embodiment the three supporting points are preferably actuators arranged in three axes of a Cartesian coordinate system and the inertial spherical body is made of a ferromagnetic material.

In this embodiment no supports (3) are used.

The satellite positioning system can have several working modes. In one embodiment, the inertial body (1) is in constant rotation, which has the effect of eliminating rotation momentum caused by solar wind, rotation momentum which can originate during the launch and deployment of the satellite in the orbit, as well as for other environmental impacts, which cause the position and orientation of the satellite to change undesirably. In another embodiment, change of rotation momentum of the inertial body is used to create rotation momentum of the satellite of a small angle and incrementally achieve desired position or adjustment of satellites attitude.

Yet in another embodiment, the same support element can act as a passive or semi active support. In this embodiment, a piezo transducer can be used at the interface of the support (3) and the spherical inertial body (1). For example, in situations where small momentum of rotation needs to be created, the support (3) is passive and in case larger momentum has to be generated, small amplitude vibrations are generated using said piezo transducer—this reduces friction and increases maximum rotational momentum, which can be created with help of actuators (2).

Yet in another embodiment, the supports (3) are based on ball plungers.

Yet in another embodiment, the supports (3) or at least tips of the supports, which are in contact with the inertial body (1) are made of low friction polymers, such as PTFE or other.

Actuators (2) preferably comprise driving elements, which can be of following types: piezoelectric (ultrasonic), magnetostrictive, DC/stepper motor or other capable of creating friction force and transferring movement to the spherical inertial body in tangential direction, by acting directly in contact to the spherical body or through an intermediate contact element.

In one of the embodiments, the intermediate contact element is a friction wheel. In this case, the preferred driving element is an electric motor, such as DC or stepper motor.

Yet in another embodiment, the intermediate contact element between the driving element of the actuator (2) and the spherical body (1) is a functional coating or a substrate having specially designed coating, whereas coating parameters are selected such as to ensure best reaction (elasticity, flatness, surface stickiness, etc.) between the actuator and the spherical body (1).

Some types of active driving element can create motion in more than one degree of freedom (DOF). For example, solid or multilayer piezo ceramics divided in several segments and/or different polarized segments or several actuators stacked on one another, thus can create tangential forces of different directions. Therefore, less actuators (those that touch the inertial body) can be used. For example two actuators can create rotational movement of the spherical inertial body (1) in all directions.

Yet in another embodiment, a single actuator can be used for creating multiple rotational modes of the spherical inertial body (1), except a rotation, where a contact point between the actuator (2) an the inertial body (1) is located on the rotational axis of the inertial body (1).

Figure 1:
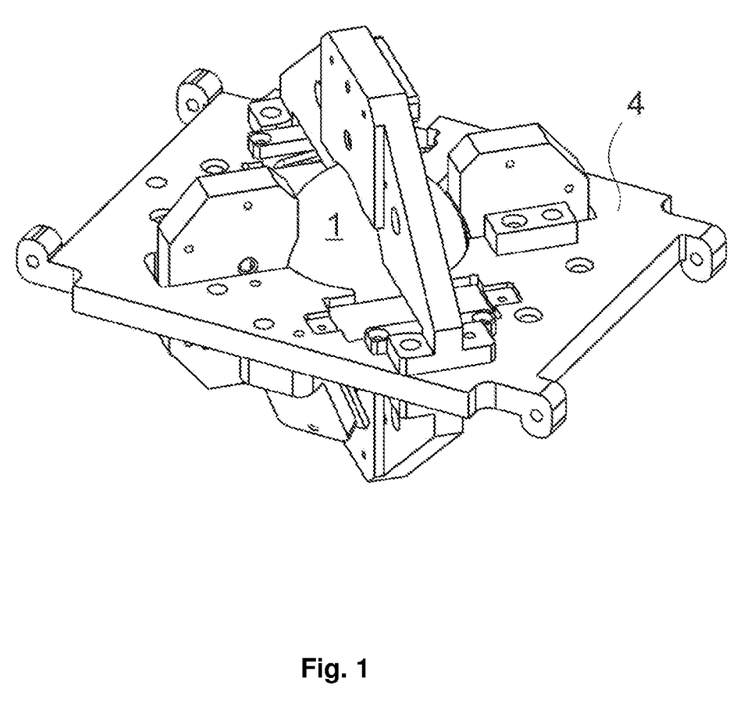
FIG. 1 is an exemplary drawing of free-form suspension system for satellites attitude control system.

In the most preferred embodiment, the positioning system is retained in a dedicated suspension system, comprising a frame, whereas supports (3) and actuators (2) are attached to this frame with one end and touch the spherical inertial body (1) with the other end. The frame preferably is of a cube or a cuboid shape, but it can also be in other shapes, such as spherical, pyramid, cylinder, cone or other free-form. An example of free-form frame (4) of the suspension system is depicted in FIG. 1.

Yet in another embodiment, the supporting frame can be connected to or designed as, or being a part of the satellite body, whereas the actuators (2) and supports (3) are forced toward the spherical inertial body (1) with help of spring elements, or some of them are rest against the support frame and the inertial body (1) directly and rigidly and some of them through spring/damping elements.

Yet in another embodiment, the actuators (2) are controlled in continuous way—by inducing and gradually changing magnitude or frequency of vibrations (in case of piezoelectric vibrations) or frequency of rotation (in case of a friction wheel).

Yet in another embodiment, feedback sensors are detecting position of a reference body in space, such as the Sun or other astronomical objects.

Yet in another embodiment, feedback sensors are detecting the actual attitude of the satellite. Such sensors could be for example accelerometers. Laser based accelerometers are also a sensitive and valid option among other types of accelerometers.

In order to keep inertial body in place at least 3 supporting elements, such as supports (3) or actuators (2) are needed in case the inertial spherical body is attracted with a magnet. Or at least 4 supporting elements are needed in case magnetic attraction is not used. FIG. 2 shows one passive or semi-active support (3) and three actuators (2), which support the inertial body (1). Some of other configurations are shown in other figures.

The spherical inertial body can be made of many different materials, the most common being steel, aluminum, brass, ceramics or other metals, alloys, glasses, plastics or composite materials. In some cases, where minimal thermal expansion is needed, alloys such as invar or super invar could be used, as well as zerodur or similar glass ceramics having coefficient of thermal expansion (CTE) close to 0 and compatibility to work at very low temperatures.

The invention claimed is:

1. A satellite attitude control system, consisting of:
   a spherical inertial body, configured to be rotatable in space in a rotational mode by creating rotational momentum to the spherical inertial body through friction;
   one or more feedback sensors;
   at least one friction based actuator; and
   a set of 3 or more supports and/or friction-based actuators, wherein all said supports and/or actuators are mounted providing a contact to the spherical inertial body to keep the spherical inertial body in 3D-space, wherein
   the actuators are configured to create the rotational momentum to the spherical inertial body through friction, and wherein
   the supports are configured to keep the spherical inertial body in place and allow 3D-rotation of the spherical inertial body by reducing contact friction.

2. The attitude control system according to claim 1, characterized in that friction based actuators comprise an active element, which is a piezoelectric material or magnetostrictive material, or direct current motor or stepper motor.

3. The attitude control system according to claim 1, characterized in that a set of 3 actuators and at least one support is used to retain the spherical inertial body in position.

4. The attitude control system according to claim 1, characterized in that said set of supports and actuators comprises three actuators and one support or two actuators and two supports, or three actuators and three supports, or three actuators and two supports, or four actuators, or six actuators.

5. The attitude control system according to claim 1, characterized in that said supports comprise low friction material at a point of tangency with said spherical inertial body.

6. The attitude control system according to claim 5, wherein the low friction material comprises PTFE.

7. The attitude control system according to claim 1, characterized in that said one or more feedback sensors are arranged to detect rotation of the spherical inertial body.

8. The attitude control system according to claim 1, characterized in that said one or more feedback sensor detects attitude of the satellite with respect to astronomical objects.

9. The attitude control system according to claim 1, characterized in that said feedback sensor comprises an accelerometer.

10. The attitude control system according to claim 1, characterized in that said supports are semi-active wherein an active element reduces friction between the support and the rotating inertial spherical body by high frequency vibrations.

11. The attitude control system according to claim 10, wherein the vibrations have a small amplitude.

12. The attitude control system according to claim 1, characterized in that actuators and supports are mounted with or without a 3D-suspension subsystem, wherein the actuators and supports are forced toward the spherical inertial body with help of spring elements, or are rigidly fixed between a support frame and the inertial body directly, or a combination thereof.

13. The attitude control system according to claim 1, wherein at least 4 of the set of 3 or more supports and/or friction-based actuators are mounted with an initial pressure to cause friction to rotate the spherical inertial body in the rotational mode.

14. The attitude control system according to claim 13, wherein the initial pressure is not increased in the rotational mode.

\* \* \* \* \*